United States Patent Office 3,403,337
Patented Sept. 24, 1968

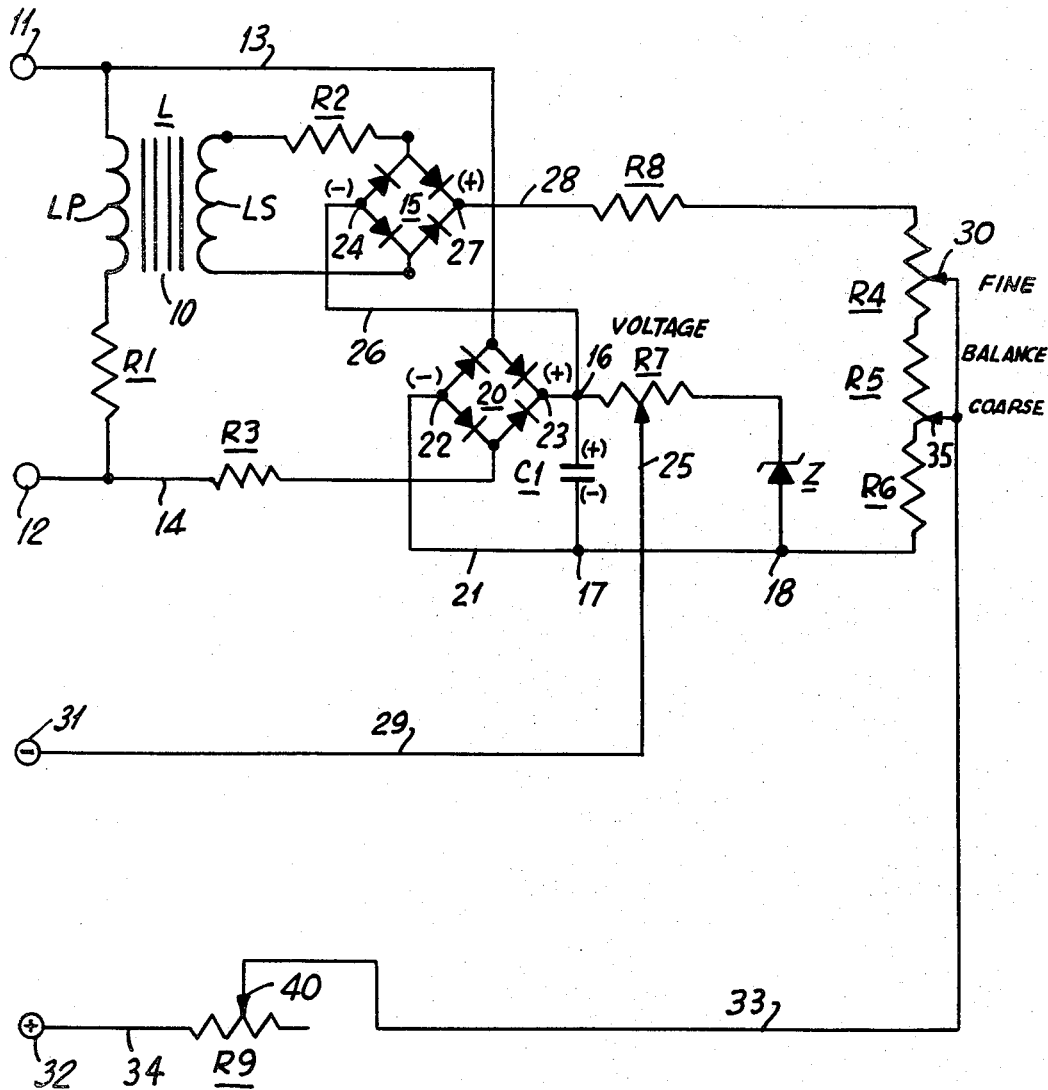

3,403,337
FREQUENCY METER UTILIZING A TRANSFORMER HAVING A NON-RECTANGULAR HYSTERESIS LOOP SATURABLE CORE AND A COMPENSATION CIRCUIT THEREFOR
Raymond H. Legatti, Moultrie, Ga., assignor to Electromagnetic Industries, Inc., Sayville, N.Y.
Filed Apr. 18, 1966, Ser. No. 543,243
10 Claims. (Cl. 324—78)

This invention relates to frequency meters or monitors and, more particularly, to an improved, simplified and less expensive frequency meter or monitor having a high accuracy and selectively adjustable to provide either expanded scale or suppressed scale readings.

A known type of frequency meter or monitor uses a saturated toroid having a paramagnetic core of "square loop" material. Such "square loop" materials have a high nickel content and a "square" systeresis loop. By the term "square hysteresis loop" is meant that, when the magnetization of the material is brought up to maximum saturation and then reduced, it returns substantially to the residual magnetization, and the plotted curve of the magnetization closely resembles a square loop.

Such "square loop" paramagnetic materials are relatively expensive and, in addition, are very sensitive to temperature variations. Consequently, there is a demand for a less expensive frequency meter using a saturated toroid and which is not affected to any appreciable extent by temperature variations.

A characteristic of a saturated toroid having a core of square loop material is that its output remains substantially constant with a change in the amplitude of the input voltage, but varies with a change in the input frequency. As contrasted with a saturated toroid utilizing a core of square loop material and in which the average output remains relatively constant irrespective of changes in input voltage, a saturated toroid having a silicon core has the characteristic that the average output follows changes of input voltage but to a lesser degree. For example, with silicon cores a 10% change in input voltage may result in a 5% change in output whereas a square loop core may only change 1% in output for a 10% input change. However, silicon cores for saturated toroids, useable in frequency meters or monitors, have the very distinct advantage that they are much less sensitive to change in temperature than are saturated toroid cores of "square loop" material, in addition to which the silicon cores are much less expensive.

An object of this invention is to provide a frequency meter or monitor which is substantially insensitive to temperature variations.

Another object of the invention is to provide a frequency meter or monitor including a saturated toroid having a silicon steel core and an input-output voltage response characteristic superior to that of a saturated toroid having a core of a square loop material.

A further object of the invention is to provide a frequency meter or monitor including a saturated toroid having a silicon steel core and novel means for substantially completely compensating the variation in output voltage of the saturated toroid with respect to input voltage.

Yet another object of the invention is to provide a frequency meter or monitor including a saturated toroid having a core of material other than square loop material and including novel compensating means, responsive directly to the input voltage, for compensating variations in the output voltage of the saturated toroid with respect to variations in the input voltage.

A further object of the invention is to provide an inexpensive, highly accurate, stable frequency meter or monitor including a saturated toroid having a core of material other than square loop material and which is responsive only to changes in frequency and substantially insensitive to changes in input voltage.

For an understanding of the principles of the invention, reference is made to the following description of a typical embodiment thereof as illustrated in the accompanying drawing.

In the drawing:

The single figure is a schematic wiring diagram of a frequency meter or monitor embodying the invention.

Referring to the drawing, the frequency meter or monitor therein illustrated includes a saturated toroid, generally designated L, including a core 10 of material other than square loop material and, in the present instance, of silicon steel. Saturated toroid L includes an input or primary winding LP and an output or secondary winding LS. Winding LP is connected, in series with a resistance R1, across conductors 13 and 14 connected to input terminals 11 and 12, respectively. Input terminals 11 and 12 are for connection to a suitable source of A.C. potential whose frequency is to be monitored by the frequency meter or monitor.

A first full wave recifier 15, which is preferably a solid state rectifier, has its input connected across the output terminals of winding LS of saturated toroid L, in series with the resistance R2. A second full wave rectifier 20 has its input connected, in series with a resistance R3, directly across input terminals 11 and 12 through the medium of conductors 13 and 14, the resistance R3 being included in conductor 14. Full wave rectifiers 15 and 20 are connected in a bridge circuit, and the output meter is connected across a diagonal of this bridge in a manner to be described more fully hereinafter.

A condenser C1 is connected across the output diagonal of full wave rectifier 20, between junction points 16 and 17. Junction point 17 is included in a conductor 21 connecting the negative output terminal 22 of full wave rectifier 20 to one terminal of an output resistance combination including series connected resistances R4, R5 and R6. The positive output terminal 23 of full wave rectifier 20 is connected to junction point 16. Conductor 21 includes a second junction point 18 which, as will be obvious, is at the same potential as junction point 17. A resistance R7 is connected, in series with a Zener diode Z, between junction points 16 and 18 so that, resistance R7 and Zener diode Z are, in effect, connected between junction points 16 and 17 in parallel with condenser C1. The negative output terminal 24 of full wave rectifier 15 is connected, by a conductor 26, to junction point 16. The positive output terminal 27 of full wave rectifier 15 is connected by a conductor 28 to the other end of the series resistance combination R4, R5, R6 a resistance R8 being included in series in conductor 28.

The arrangement thus far described operates in the following manner. The output from winding LS of saturated toroid L will vary somewhat with the input voltage applied across winding LP of saturated toroid L, due to the silicon steel core 10. Junction point 16 measures the peak input voltage, which is a variable voltage, and it will be noted that junction point 16 is at one end of resistance R7. The other end of resistance R7 is clamped, as to voltage, by Zener diode Z. Resistance R7 is an adjustable resistance including an adjustable tap 25 connected by a conductor 29 to negative output terminal 31.

Resistance R4 is also an adjustable resistance which is finely adjustable and has an adjustable tap 30. Resistance R5 is a coarsely adjustable resistance which has an adjustable tap 35. A conductor 33 commonly connects taps 30 and 35 to the adjustable tap 40 of a resistance R9 which is connected, by a conductor 34, to the positive output terminal 32.

Considering the condition mentioned above in which junction point 16 measures the peak input voltage, which is a variable voltage that this is effective at one end of resistance R7, and that the other end of resistance R7 is clamped, as to voltage, by Zener diode Z, adjustment of tap 25 of resistance R7 can be used to select a point where the slope of the input voltage curve corresponds to the voltage characteristic of full wave rectifier 15. This will compensate for the change in the output of saturated toroid L with variations in input voltage. In effect, the variation in input voltage is fully compensated and the meter will respond only to changes in frequency.

The series resistance combination R4, R5, R6, with associated taps 30 and 35, effects both coarse and fine balance with respect to variations in the characteristics of the material used for core 10 of saturated toroid L. There are four adjustments in the disclosed frequency meter or monitor. One is the coarse adjustment of the bridge, including the rectifiers 15 and 20, and which is effected by adjustment of tap 35. Fine adjustment of the bridge is effected by adjustment of tap 30. Adjustment of tap 25 of resistance R7 compensates for the amplitude characteristic of saturated toroid L. The fourth adjustment is the tap 40 of resistance R9, and this varies the drive of an output instrument connected across output terminals 31 and 32. Such an output instrument may be, for example, a D.C. microammeter which is preferably calibrated in frequency. Expanded scale or suppressed scale readings of the output meter are provided by changing the adjustments of the bridge in accordance with the particular range or frequency which is to be controlled or determined or monitored.

The described frequency meter or monitor has an accuracy of one-half percent, and a temperature compensation so that it will work within one-half percent in the range of −65° to 175° F. The input voltage may be from 100 volts to 135 volts, this being the nominal voltage rating and, over this range of voltage, the meter has an accuracy of one-quarter percent. The meter further has an accuracy of one-quarter percent with respect to distortion of the input wave form up to 10%. It is particularly useful for monitoring frequencies, as in military applications, engine driven alternators, and the like, and can be designed for almost any frequency band.

While a specific embodiment of the invention has been shown and described to illustrate the application of the principles of the invention, it will be understood that the invention may be embodied otherwise without departing from such principles.

What is claimed is:

1. A frequency meter or monitor comprising, in combination, a pair of input terminals for connection to a source of variable A.C. potential; a saturated toroid, having a core of paramagnetic material, other than square loop paramagnetic material, connected across said input terminals and having an output voltage variable with the input potential; a first full wave rectifier having its input connected to the output of said saturated toroid; a second full wave rectifier having its input connected directly across said input terminals; means connecting the outputs of said full wave rectifiers in series in a bridge circuit; comparison means connected to the junction of said full wave rectifiers and operable to compare the output voltages of said full wave rectifiers, said comparison means including means clamping at least a portion of the output voltage of said second full wave rectifier; voltage adjusting means included in said comparison means and in a diagonal of said bridge circuit; and a pair of output terminals, for connection to a frequency meter or monitor means, connected to said voltage adjusting means across said diagonal; said voltage adjusting means being operable to effect relative adjustment of the output voltages of said full wave rectifiers to a point where the slope of the input potential curve corresponds to the output voltage characteristic of said first full wave rectifier, to compensate fully for the change in output of said saturated toroid with variations in said input potential.

2. A frequency meter or monitor, as claimed in claim 1, in which the characteristics of the core of said saturated toroid are such that the output of said saturated toroid is substantially insensitive to temperature variations.

3. A frequency meter or monitor, as claimed in claim 1, in which the core of said saturated toroid is silicon steel.

4. A frequency meter or monitor, as claimed in claim 3, in which said comparison means comprises a capacitor connected across the output terminals of said second full wave rectifier.

5. A frequency meter or monitor as claimed in claim 4, in which said comparison means includes a resistance and a Zener diode connected in series across the output of said second full wave rectifier, said resistance having an adjustable tap and constituting said voltage adjusting means.

6. A frequency meter or monitor, as claimed in claim 5, including a capacitor connected across the output of said second full wave rectifier in parallel with the series combination of said resistance and said Zener diode.

7. A frequency meter or monitor, as claimed in claim 3, in which the junction of said full wave rectifiers is the positive output terminal of said second full wave rectifiers; said comparison means including a capacitor connected to said junction and to the negative output terminal of said second full wave rectifier, a resistance having one terminal connected to said junction, and a Zener diode having one terminal connected to the other terminal of said resistance and to the negative output terminal of said second full wave rectifier in parallel with said capacitor; said resistance including an adjustable tap and constituting said voltage adjusting means; one output terminal being connected to said adjustable tap.

8. A frequency meter or monitor, as claimed in claim 7, in which said junction is also coincident with the negative output terminal of said first full wave rectifier; said bridge further including resistance means connected between the positive output terminal of said first full wave rectifier and the negative output terminal of said second full wave rectifier, and including adjustable tap means; the other output terminal being connected to said adjustable tap means.

9. A frequency meter or monitor, as claimed in claim 8, in which resistance means includes a second resistance and a third resistance in series with each other; said tap means including a second adjustable tap for said second resistance and a third adjustable tap for said third resistance, said second and third adjustable taps being commonly connected to said other output terminal; one of said second and third resistances and its associated tap providing a coarse balancing adjustment, and the other of said second and third resistances and its associated tap providing a fine balancing adjustment, of said bridge circuit with respect to variations in the characteristics of the material used for the core of said saturated toroid.

10. A frequency meter or monitor, as claimed in claim 9, including a fourth resistance connected between said second and third taps and said other output terminal and adjustable to vary the drive of on output meter connected across said output terminals to expand or suppress the scale readings thereof in accordance with the particular frequency range which is to be metered or monitored.

References Cited

UNITED STATES PATENTS 1,902,496  3/1933  Fitz Gerald.
2,958,038  10/1960 Kwast.
2,962,658  11/1960 Trexler.
3,103,628  9/1963  Takaya.
3,244,959  4/1966  Thompson et al.

RUDOLPH V. ROLINEC, *Primary Examiner.*

P. F. WILLE, *Assistant Examiner.*